United States Patent [19]
Rogers

[11] Patent Number: 5,813,807
[45] Date of Patent: Sep. 29, 1998

[54] PLUNGE ROUTER GUIDE

[76] Inventor: Winston L. Rogers, 1690 Turnpointe Rd., Friday Harbor, Wash. 98250

[21] Appl. No.: 799,105

[22] Filed: Feb. 11, 1997

[51] Int. Cl.[6] .................. B23C 9/00; B27C 5/10
[52] U.S. Cl. .................. 409/178; 33/197; 144/27; 144/144.51; 409/175
[58] Field of Search .................. 409/175, 178, 409/125, 130, 181, 182; 144/141.51, 27, 144.1, 145.1; 33/197

[56] References Cited

U.S. PATENT DOCUMENTS

| | | | |
|---|---|---|---|
| 3,800,840 | 4/1974 | McCord, Jr. | 144/144.5 |
| 4,407,344 | 10/1983 | Dicke | 144/144.51 |
| 4,428,408 | 1/1984 | Grisley | 144/144.5 |
| 4,603,717 | 8/1986 | Thomas | 144/144.51 |
| 4,770,216 | 9/1988 | Ruscak | 144/144.51 X |
| 4,809,755 | 3/1989 | Pontikas | 144/87 X |
| 4,966,507 | 10/1990 | Hanks | 409/182 X |
| 5,040,581 | 8/1991 | Takashima | 409/175 X |
| 5,052,454 | 10/1991 | Meinhardt | 409/175 X |
| 5,114,265 | 5/1992 | Grisley | 144/144.5 |
| 5,154,214 | 10/1992 | Hagerman | 33/197 X |
| 5,203,389 | 4/1993 | Goodwin | 409/182 |
| 5,240,052 | 8/1993 | Davison | 144/145.1 X |
| 5,249,614 | 10/1993 | Osborn | 409/182 |
| 5,285,831 | 2/1994 | Woolgar . | |
| 5,325,899 | 7/1994 | Kochling | 144/144.1 |

*Primary Examiner*—William R. Briggs
*Attorney, Agent, or Firm*—Jensen & Puntigam, P.S.

[57] ABSTRACT

The present invention concerns an apparatus for allowing the operator of a plunge router to make accurate mortising or doweling cuts in a workpiece and more particularly to allow dowel holes or mortises to be executed in pieces of wood which are to be secured together. The apparatus comprises a base plate having adjustable lateral guides flanking an opening in the base for allowing the passage of a router bit. Removably securable to the base plate is a reversible member or gate including adjustable end guides such that removal and reversal of the gate member permits the user to perform an identical mirror image operation on the second of two workpieces to be matched.

3 Claims, 5 Drawing Sheets

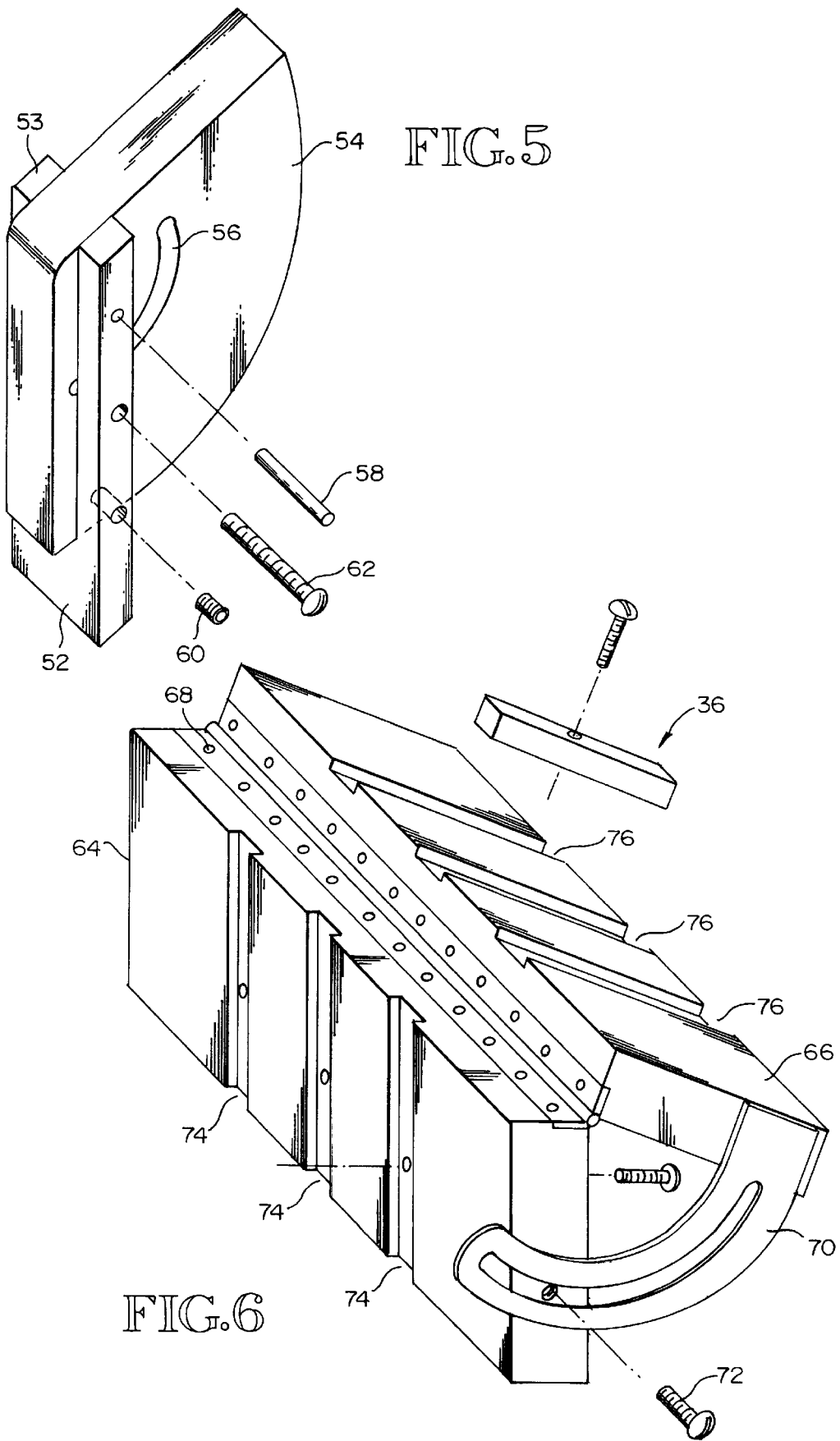

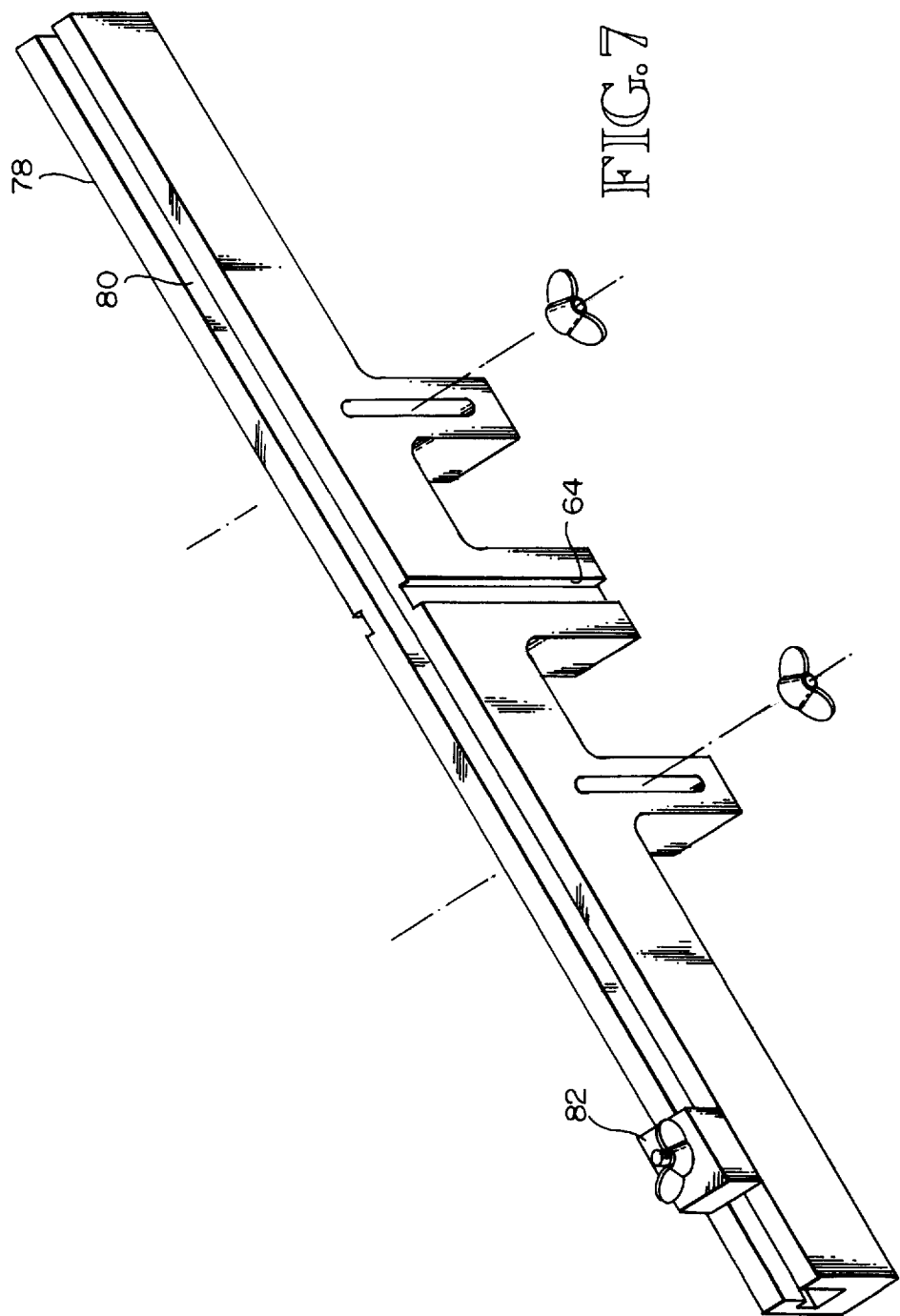

PLUNGE ROUTER GUIDE

TECHNICAL FIELD

The present invention deals with apparatus for allowing the operator of a plunge router to make accurate mortise utilizing loose (floating) tenons or dowel connections and more particularly to allow mirror image dowel holes or mortises to be executed in pieces of wood which are to be secured together. In particular, the presents invention deals with a mirror image device, including a base plate having adjustable lateral guides as well as an opening for allowing the passage of the router bit. Movably secured to the plate is a reversible member or gate including adjustable end guides such that removal and reversal of the frame member permits the user to perform an identical operation with the plunge router on the second of two pieces to be matched, creating a mirror image which insures that the two elements will be joined accurately. When the mortise or bore to receive the floating tenon or dowel are at an angle to the surface of the material, the present invention again proscribes accurate mirror images assuring accurate, professional joints.

BACKGROUND ART

Mortise and tenon joints and dowel joints are universally agreed to be stronger and thus more desirable than straight glue joints. In the past skilled craftsmen have been able to construct these joints accurately even using hand tools. However, most persons who desire to fabricate furniture and other structures from wood lack the skill and/or experience to make accurate mortise and/or dowel joints, and therefore, end up with an inferior joint or are required to perform an extraordinary mount of finish work to result in a satisfactory product.

U.S. Pat. No. 3,800,840, granted to McCord Jr. On Apr. 2, 1974, discloses a fixture for using a router to simultaneously cut interlocking dovetails.

U.S. Pat. No. 4,407,344, granted to Dicke on Oct. 4, 1983, discloses a dovetail fixture for simultaneously doing interlocking mortise and tenon to form the dovetail corner joint.

U.S. Pat. No. 4,428,407, granted to Grisley on Jan. 31 1984, discloses a dovetailing jig wherein the common joint members are cut along one edge of the jig support and the complementary joint members are cut along the other edge.

U.S. Pat. No. 4,603,717, granted to Thomas on Aug. 5, 1986, discloses a sliding dovetail template and the template can be used for cutting the sliding dovetail tongues and grooves on wooden workpieces of different thicknesses and sizes.

U.S. Pat. No. 4,809,755, granted to Pontikas on Mar. 7, 1989, discloses an apparatus and method for forming a variety of woodworking joints wherein the workpiece is clamped to a support member having a template and then the entire apparatus is moved over an inverted router which is mounted beneath the work station to make the matching element.

U.S. Pat. No. 4,966,507, granted to Hanks on Oct. 30, 1990, discloses a basically rectangular open, centered base plate member to which is secured adjustable clamp mechanisms perpendicular to each other and vertically spaced such that they can clamp pieces for various cutting operations.

U.S. Pat. No. 5,052,454, granted to Meinhardt on Oct. 1, 1991, discloses a system for routers including a base upon which the piece is clamped and a frame-like element which overlies the workpiece into which a variety of shaped guides may be placed, allowing the operator to generate a string of characters.

U.S. Pat. No. 5,114,265, granted to Grisley on May 19, 1992, discloses a template used in conjunction with a router to manufacture an interlocking joint.

U.S. Pat. No. 5,203,389, granted to Goodwin on Apr. 20, 1993, discloses an apparatus for use with a router and includes a mechanical router positioning mechanism which prevents inadvertent movement of the router.

U.S. Pat. No. 5,285,831, granted to Woolgar on Feb. 15, 1994, discloses an apparatus for making a plurality of parallel dado cuts.

U.S. Pat. No. 5,325,899, granted to Kochling on Jul. 5, 1994, discloses a router fixture which comprises a base and a pair of slidably adjustable horizontal guides which capture a precut template which then guides the router itself.

DISCLOSURE OF THE INVENTION

With the above-noted prior art in mind, it is an object of the present invention to provide a device for use with a plunge router wherein a relatively unskilled person can make accurate and clean mortises and dowel bores.

It is a further object of the present invention to provide a device wherein the base member is secured to the workpiece and a readily removable gate member which is reversed on the base member to assure a exact mirror image of the operation previously performed.

It is yet another object of the present invention to provide a device for manufacturing mirror image mortises and which device can be readily and easily used on relatively wide workpieces as well as at any one of a number of relative angles.

It is still a further object of the present invention is to provide an accessory for use with a plunge router which is accurate and easy to use resulting in a superior end product.

BRIEF DESCRIPTION OF THE DRAWINGS

FIG. 5 is an attachment allowing a workpiece to be mounted at various angles.

FIG. 6 is another method of doing angled attachments.

FIG. 7 is another attachment to simplify the handling of long boards and permitting the placement of dowel holes and/or mortices along the long dimension.

BEST MODE FOR CARRYING OUT THE INVENTION

Figure 1:
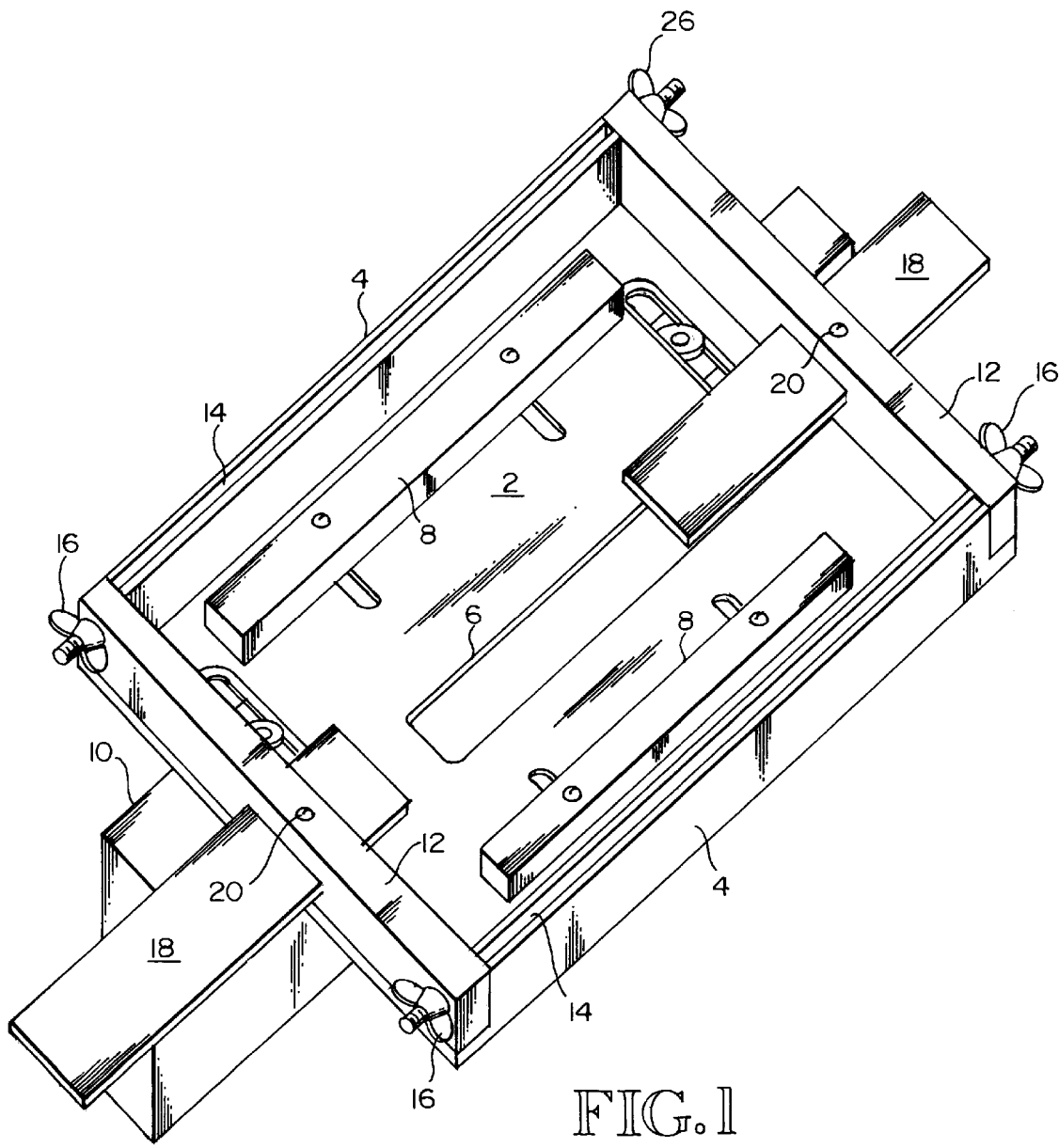
FIG. 1 is a pictorial representation of the apparatus.

As seen in FIG. 1, the inventive apparatus includes a base plate 2 to which are secured a pair of parallel upwardly open channel members 4 along the length of the base plate. In the center of the base plate, parallel to the channel members 4 is an elongated rectangular opening 6 through which the router bit operates.

Parallel to the upwardly open channel members 4 designed for movement toward and away from the channel members 4 are a pair of lateral guides 8. Secured to the bottom of base plate 2 is a workpiece mounting board 10, again, mounted for movement toward and away from the channels 4 and always parallel thereto.

As further seen in this view is the mirror image apparatus referred to as a gate which includes a pair of parallel end members 12 secured together by means of parallel rods 14 which are threaded. at least at the ends and are held in position by wing nuts 16. A pair of end guides or stops 18 extend through the end pieces 12 and are locked in position by a threaded members 20. As explained hereinafter, reversing the gate and placing the mating workpiece on the other side of a center stop assures a mirror image/perfect fit.

Although it is possible to replace channels 4 with other structural elements, it must be emphasized that when the rods are in place and secured by wing nuts 16, the channels prevent any distortion to the end members 12 since they are abutted by the ends of the channels on both sides of the rods 16.

Figure 2:
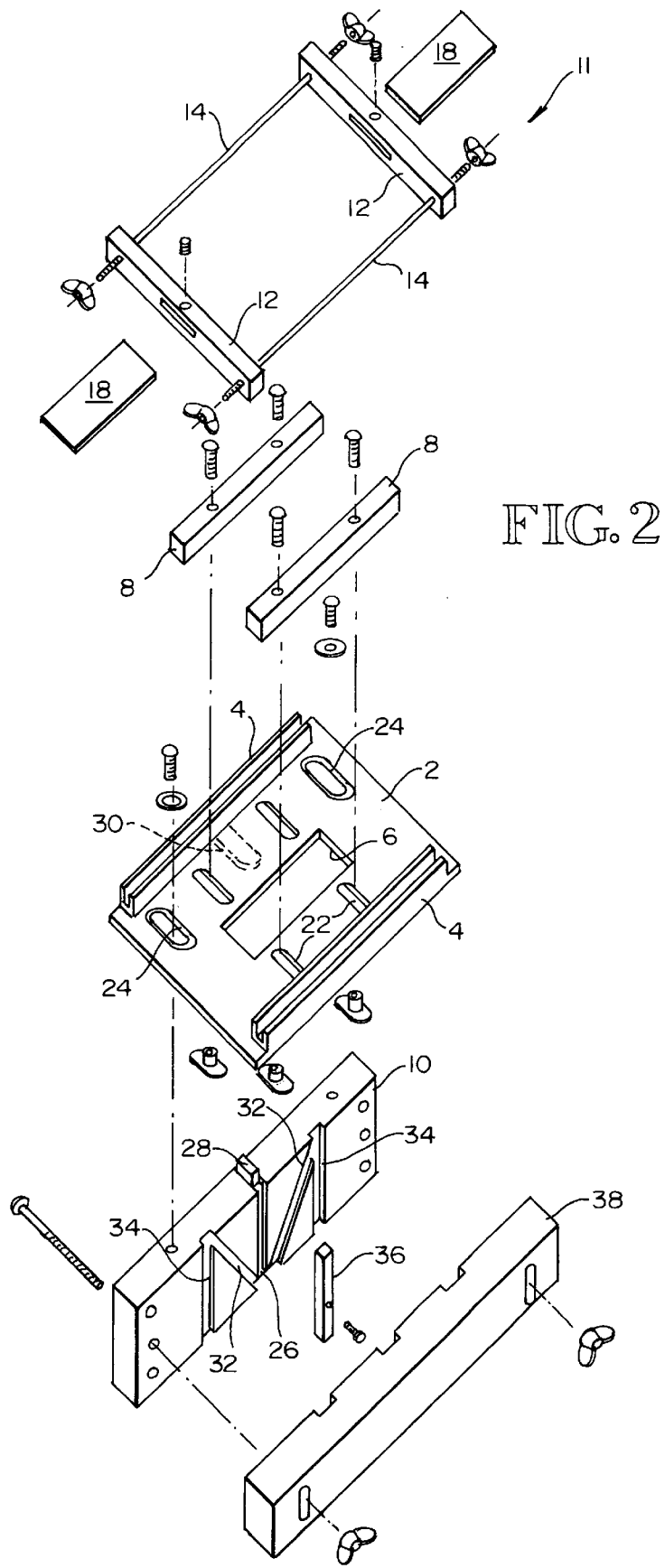
FIG. 2 is an exploded view of the inventive apparatus.

Reference is now had to FIG. 2 wherein the various elements as called out with respect to FIG. 1 can be seen in exploded form and their interrelationships more easily discerned. Further to be seen in this view are the parallel slots 2 allowing for movement of guide members 8 as well as parallel slots 24 allowing for movement of the workpiece mounting board 10. It is to be noted that workpiece mounting board 10 includes a vertical slot 26 at its exact center and a horizontal slot at the upper portion thereof. A guide member 28 is mounted in the horizontal portion of workpiece mounting board 10 and interacts with slot 30 in the under side of the base plate 2 thus assuring that vertical slot 26 is always at the exact center of the long dimension of the base plate 2 and router bit receiving opening 6. Likewise as seen in this view, a pair of angled slots 32 are formed as well as a pair of equidistant slots 34 which are parallel to center slot 26. Center stop 36 can be placed in any one of the slots 26, 32 or 34 to serve as a stop means and a locating element for the workpiece. The clamping bar 38 is likewise shown in this view.

Figure 3:
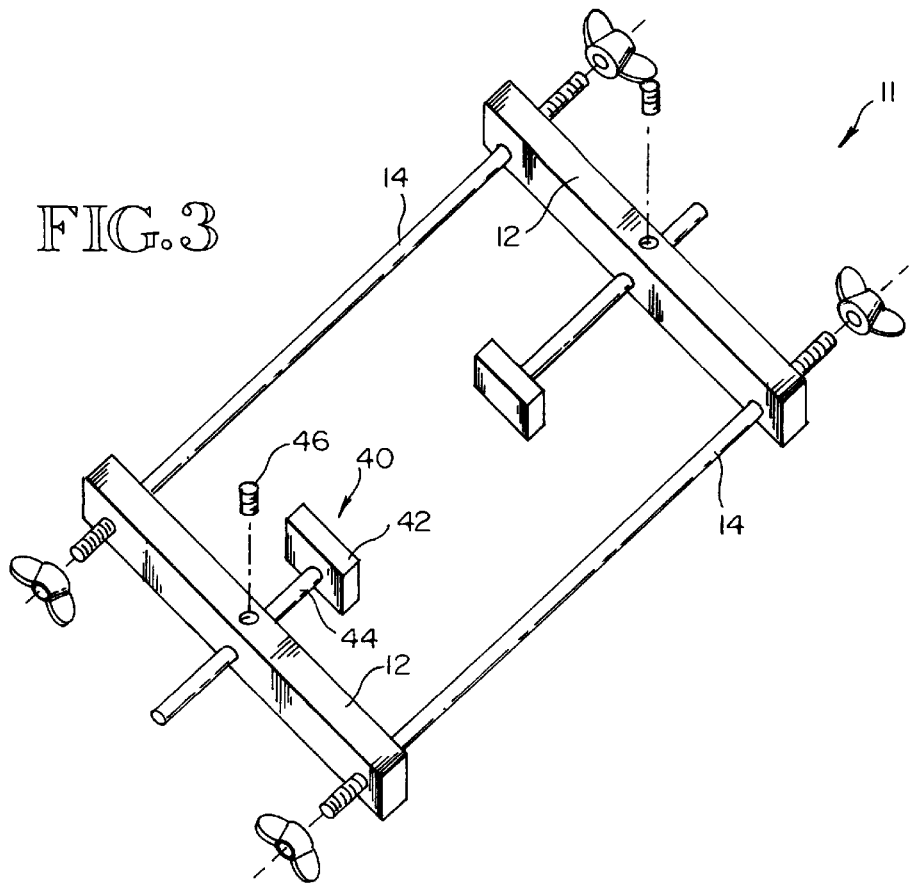
FIG. 3 is another possible configuration for a gate assembly.

FIG. 3 shows an alternate form of gate element 11 including end members 12 and the threaded parallel joining members 14, however a different form of adjustable stop 40 is shown having end pieces 42 and supporting dowels 44 and stop screw 46.

Figure 4:
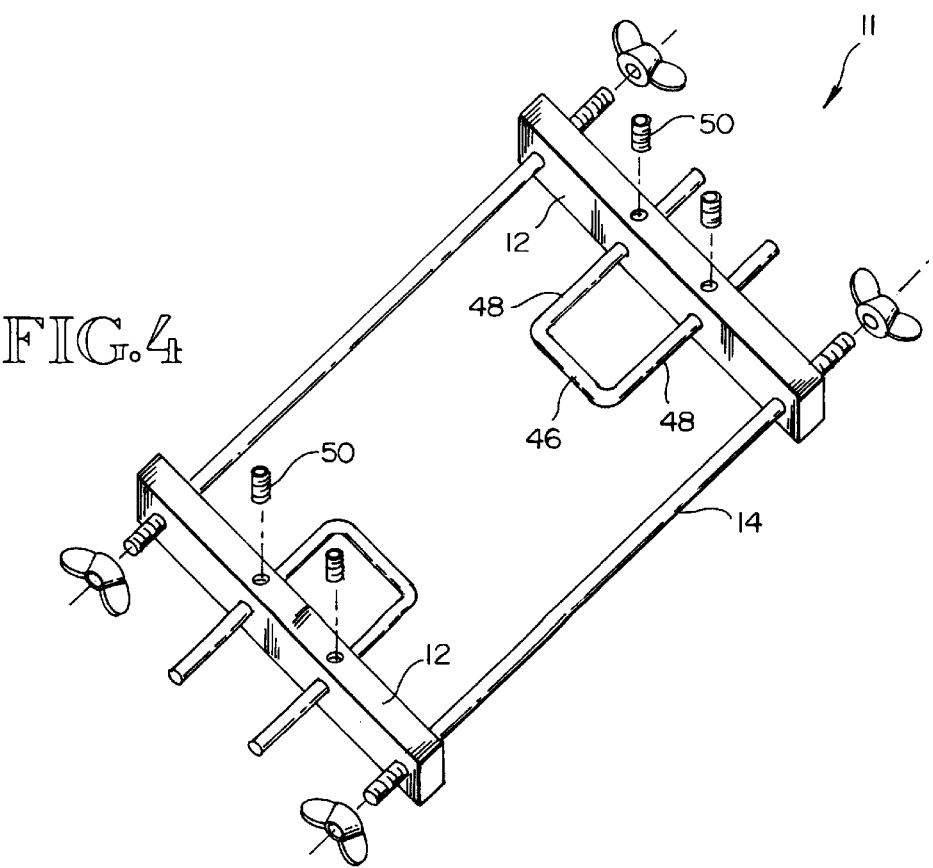
FIG. 4 is yet another possible configuration for a gate assembly.

FIG. 4 utilized identical figures to designate the common portions with FIGS. 1–3 but uses as end stops rigid U-shaped elements 46 having parallel legs 48 which extend through bores in the end members 12 and likewise are secured in position by threaded members 50.

Reference is now had to FIG. 5 which depicts an attachment allowing an infinite number of angular interconnections between pieces. The attachment consists of a U-shaped yoke member 52 which is pivotably secured to a guide member 54 which includes an arcuate groove 56. Guide member 54 is rotatably secured to yoke member 52 by pin 58 allowing the angular adjustment between 52 and 54 and is secured in position by fastening member 60. The legs 53 and element 52 are designed to fit in the grooves 26 or 34 of the workpiece mounting board and secured in position by through fastener 62. The workpiece rests adjacent the guide means 54 can be placed at any desired angle with respect to the base plate 2 and thus the router bit itself.

Another accessory for placing mortises or dowel holes at an angle in the workpiece allowing angled connections as shown in FIG. 6; however, this accessory allows these openings to be placed along the edge of elongated workpieces. The accessory consists of two identical support elements 64, 66 secured together by a piano hinge 68 and the angle is controlled by an arcuate strap 70 secured to one of the identical support members and allowing angular adjustment between the members 64, 66 by means of an arcuate slot though which a fastener 22 is passed when the correct angle is achieved. It is to be noted that there are a plurality of parallel slots 74, 76 and these support members 64, 66 to accommodate the central stop 36 which may be placed as previously described. The workpiece is mounted on the support for work thereon.

As seen in FIG. 7, an elongated member 78 having a key groove 80 running the length thereof is provided for supporting elongated pieces during the operation thereon by the present tool. A stop member 82 is movable along the slot 80 and is secured in place by a T nut which is wedgably secured in the slot 78. A stop or guide (not shown) interacts with slot 84 in a manner previously described and the workpiece is mounted to the opposite side of the element 78.

As can be seen, the present invention provides a safe, relatively inexpensive, and accurate means for manufacturing the elements necessary for utilization of the preferred securement means between two elements of wooden furniture.

I claim:

1. A jig for use with a router, including a base and a bit, comprising:

a base plate to which a workpiece is clamped, said base plate including an elongated opening through which the router bit passes to operate upon the workpiece, said opening being of a greater dimension than the router bit to allow variability in the operation, said base plate including a pair of guides, parallel to said elongated opening, said guides being adjustable in a direction transverse to said opening, limiting the movement of the router in said direction; and a rectangular gate element including a pair of end pieces connected by side members wherein the end pieces include adjustable stop members extending into the space within the rectangular gate, said gate and said base having complementary structure whereby said gate is removably attachable to the base plate to permit easy removal and reversal to create a mirror image of the router operation.

2. A jig as in claim 1, wherein said stop elements and said guides each control movement through contact with the base of the router.

3. A jig as in claim 1, wherein said complementary structure provides that when the gate is secured to the base the end elements are substantially undistorted.

\* \* \* \* \*